US012119572B2

(12) United States Patent
Xu et al.

(10) Patent No.: US 12,119,572 B2
(45) Date of Patent: Oct. 15, 2024

(54) BASE STATION ANTENNA

(71) Applicant: Suzhou Luxshare Technology Co., Ltd., Suzhou (CN)

(72) Inventors: WenKai Xu, Suzhou (CN); ChengYu Xu, Suzhou (CN); KangNing Lv, Suzhou (CN); ZhenHua Li, Suzhou (CN); WanQiang Zhang, Suzhou (CN); ZhengGuo Zhou, Suzhou (CN); Gang Zhou, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 137 days.

(21) Appl. No.: 17/972,025

(22) Filed: Oct. 24, 2022

(65) Prior Publication Data

US 2023/0133099 A1 May 4, 2023

(30) Foreign Application Priority Data

Nov. 1, 2021 (CN) ......................... 202111280615.0

(51) Int. Cl.
*H01Q 9/28* (2006.01)
*H01Q 1/24* (2006.01)

(52) U.S. Cl.
CPC ............. *H01Q 9/285* (2013.01); *H01Q 1/246* (2013.01)

(58) Field of Classification Search
CPC ............................... H01Q 9/285; H01Q 1/246
See application file for complete search history.

(56) References Cited

FOREIGN PATENT DOCUMENTS

| | | | |
|---|---|---|---|
| CN | 204905433 | U | 12/2015 |
| CN | 105655702 | A | 6/2016 |
| CN | 107069197 | A | 8/2017 |
| CN | 107819195 | A | 3/2018 |
| CN | 109216945 | A | 1/2019 |
| CN | 210142711 | U | 3/2020 |
| CN | 211126032 | U | 7/2020 |
| CN | 211829186- | | 10/2020 |
| CN | 112186344 | A | 1/2021 |

*Primary Examiner* — Graham P Smith
(74) *Attorney, Agent, or Firm* — Birch, Stewart, Kolasch & Birch, LLP

(57) ABSTRACT

Disclosed is a base station antenna, which includes a substrate and an antenna sub-array. The antenna sub-array includes a feeding plate, a plurality of radiation units, and two metal baffles. The feeding plate is disposed on the substrate. The plurality of radiation units are disposed on the feeding plate along a first direction and electrically connected to the feeding plate. The two metal baffles are respectively disposed on two sides of the feeding plate along a second direction perpendicular to the first direction, and each metal baffle extends along the first direction. Each metal baffle is provided with an opening slot, and the length of the opening slot along the first direction corresponds to a wavelength of a center frequency of the base station antenna. Therefore, the base station antenna can achieve the technical effects of converging the horizontal beam width and optimizing the cross polarization ratio.

19 Claims, 10 Drawing Sheets

100

124

BASE STATION ANTENNA

CROSS REFERENCE TO RELATED APPLICATION

This application claims the priority benefit of Chinese Patent Application Serial Number 202111280615.0, filed on Nov. 1, 2021, the full disclosure of which is incorporated herein by reference.

BACKGROUND

Technical Field

The present disclosure relates to the technical field of communication technology, and in particular to a base station antenna.

Related Art

The base station antenna is an important connection bridge in mobile communication devices, and the quality of the base station antenna affects the communication quality of the mobile device. At present, the multi-input/multi-output (MIMO) technology that uses multiple radiation units for signal transmission and reception has attracted the attention of related industries because it can improve the utilization efficiency of spectrum and energy through different dimensions (e.g., the spatial domain, the time domain, the frequency domain, and the polarization domain), and achieve greater wireless data traffic and connection reliability.

In existing base station antennas, the oscillator of the radiation unit is generally a die-cast oscillator or a sheet metal oscillator. However, the radiation unit using the die-cast oscillator has the problem of poor performance of the base station antenna due to insufficient beam width convergence, and the radiation unit using the sheet metal oscillator has the problem that the base station antenna have insufficient performance due to insufficient horizontal beam width convergence and poor cross polarization ratio.

Therefore, how to improve the convergence of the horizontal beam width and the cross polarization ratio of the base station antenna is a technical problem to be solved.

SUMMARY

The present disclosure provides a base station antenna, which can effectively solve the problems of insufficient convergence of the horizontal beam width and poor cross polarization ratio of the base station antenna in the prior art.

In order to solve the above technical problem, the present disclosure is implemented as follows.

The present disclosure provides a base station antenna, which includes a substrate and an antenna sub-array. The antenna sub-array includes a feeding plate, a plurality of radiation units and two metal baffles. The feeding plate is disposed on the substrate. The plurality of radiation units are disposed on the feeding plate along a first direction and electrically connected to the feeding plate. The two metal baffles are respectively disposed on two sides of the feeding plate along a second direction perpendicular to the first direction, and each metal baffle extends along the first direction. Each metal baffle is provided with an opening slot, and a length of the opening slot of each metal baffle along the first direction corresponds to a wavelength of a center frequency of the base station antenna.

In the embodiment of the present disclosure, by disposing two metal baffles each having the opening slot on two sides of the feeding plate provided with multiple radiation units along the first direction, respectively, and the length of each opening slot along the first direction corresponds to the wavelength of the center frequency of the base station antenna, the base station antenna can achieve the technical effects of converging the horizontal beam width and optimizing the cross polarization ratio.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
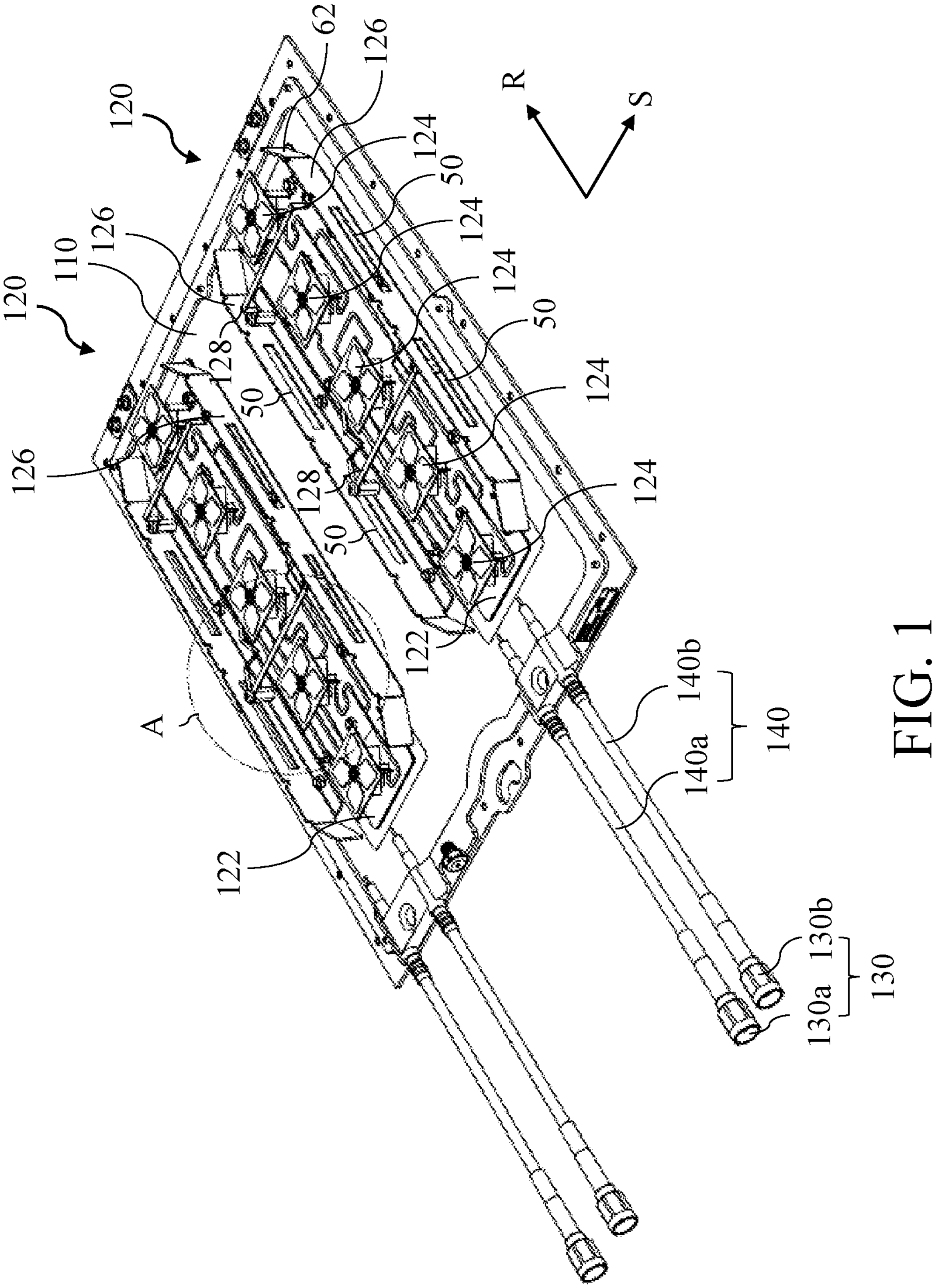
FIG. 1 is a three-dimensional schematic diagram of a base station antenna according to an embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to".

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Figure 2:
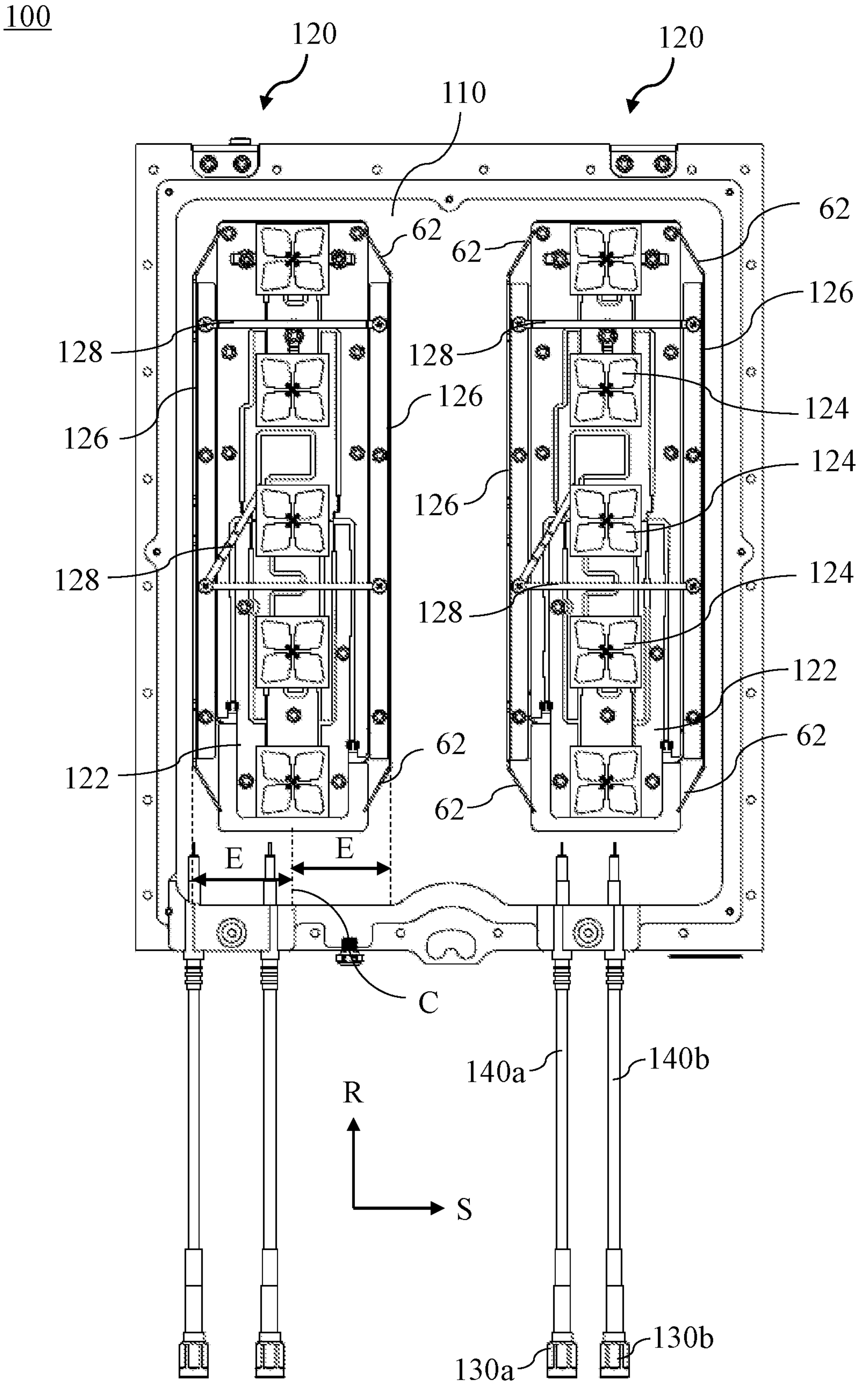
FIG. 2 is a top view of the base station antenna of FIG. 1.
Figure 3:
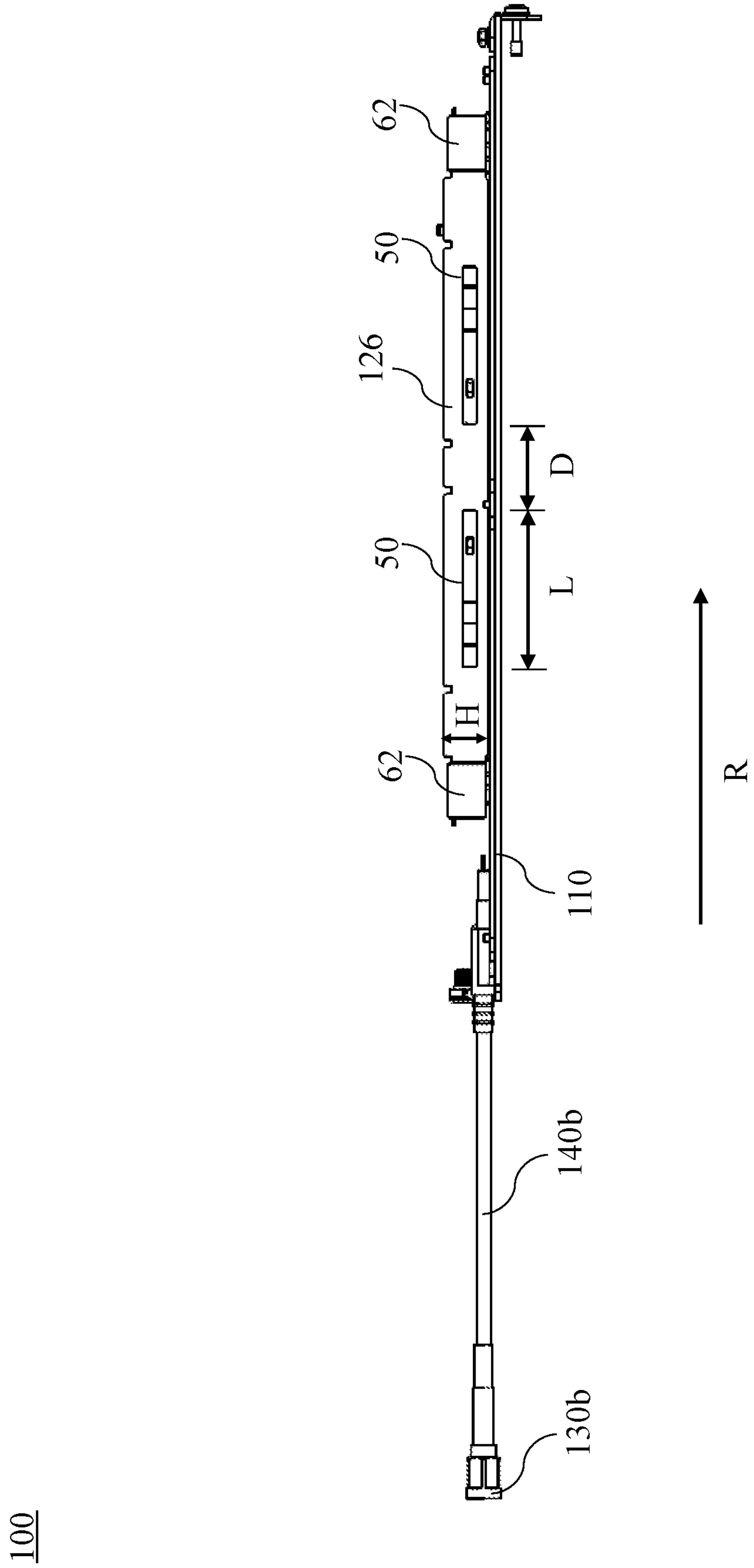
FIG. 3 is a side view of the base station antenna of FIG. 1.

Please refer to FIGS. 1 to 3, wherein FIG. 1 is a three-dimensional schematic diagram of a base station antenna according to an embodiment of the present disclosure, FIG. 2 is a top view of the base station antenna of FIG. 1, and FIG. 3 is a side view of the base station antenna of FIG. 1. As shown in FIGS. 1 to 3, the base station antenna 100 comprises a substrate 110 and an antenna sub-array 120. The antenna sub-array 120 comprises a feeding plate 122, a plurality of radiation units 124 and two metal baffles 126. The feeding plate 122 is disposed on the substrate 110. The plurality of radiation units 124 are disposed on the feeding plate 122 along the first direction R and are electrically connected to the feeding plate 122. The two metal baffles 126 are respectively disposed on two sides of the feeding plate 122 along a second direction S perpendicular to the first direction R, and each metal baffle 126 extends along the first direction R. Each metal baffle 126 is provided with an opening slot 50, and the length L of the opening slot 50 of each metal baffle 126 along the first direction R corresponds to a wavelength of a center frequency of the base station antenna 100. The first direction R is the extension direction of the substrate 110 and the feeding plate 122. The feeding plate 122 provides radio frequency signals to the radiating units 124, which are electrically connected to the feeding plate 122, for transmission. and receives radio frequency signals from the radiating units 124, which are electrically connected to the feeding plate 122. In this embodiment, the number of radiation units 124 included in the antenna sub-array 120 may be but not limited to five, and the actual number of radiation units 124 included in the antenna sub-array 120 can be adjusted according to actual requirements.

In an example, the substrate 110 is a reflective plate for reflecting radiation. In an example, the substrate 110 is a part of the housing of the base station antenna 100.

In an embodiment, the propagation velocity (v) of the electromagnetic wave is the product of the frequency (f) of the electromagnetic wave and the wavelength (2) of the electromagnetic wave, and the wave velocity of the electromagnetic wave in the air is approximately $3\times10^8$ m/s, so the length L of the opening slot 50 of each metal baffle 126 along the first direction R may be approximately 55 millimeters (mm) when the center frequency of the base station antenna 100 may be 4.15 GHz. Therefore, the length L of the opening slot 50 of each metal baffle 126 along the first direction R may be 0.8 times the wavelength of the center frequency of the base station antenna 100, wherein one times the wavelength is 72 mm.

In an embodiment, the height H of the metal baffle 126 may be greater than the height of each radiation unit 124, so as to improve the isolation of the base station antenna 100, as shown in FIG. 2, wherein the metal baffle 126 completely shades the radiation units 124 in the side view along the second direction S.

In an embodiment, when the metal baffle 126 is provided with only a single opening slot 50, the opening slot 50 of the metal baffle 126 is located at the center position of the metal baffle 126 along the first direction R.

In an embodiment, the metal baffle 126 may be provided with a plurality of opening slots 50, and the greater the number of the opening slots 50 provided within the limited length of the metal baffle 126, the better the convergence of the horizontal beam width of the base station antenna 100. In an example, the number of opening slots 50 provided by the metal baffle 126 may be but not limited to two, as shown in FIG. 3, and the actual number of opening slots 50 provided by the metal baffle 126 can be adjusted according to actual requirements. In addition, the number of opening slots 50 provided by each of the two metal baffles 126 can be the same or different, and can be adjusted according to actual requirements.

In an embodiment, when the metal baffle 126 is provided with a plurality of opening slots 50, the plurality of opening slots 50 of the metal baffle 126 are located symmetrically with respect to the center position of the metal baffle 126 along the first direction R.

In an example, when the number of opening slots 50 provided by the metal baffle 126 is 2N+1, the middle position of the (N+1)th opening slot 50 along the first direction R is located at the center position of the metal baffle 126 along the first direction R, wherein N is a positive integer.

In another example, when the number of opening slots 50 provided by the metal baffle 126 is 2N, the 2N opening slots 50 are located symmetrically along the first direction R with the center position of the metal baffle 126 as the symmetric point, wherein N is a positive integer.

In an embodiment, when the metal baffle 126 is provided with a plurality of opening slots 50 along the first direction R, the distance D between two adjacent opening slots 50 may be equal to 0.25 times the wavelength of the center frequency of the base station antenna 100.

In an embodiment, the feeding plate 122 has a central axis C extending along the first direction R and located in the middle position between the two sides of the feeding plate 122 along the second direction S, the plurality of radiation units 124 are arranged along the central axis C, and the distance E between the central axis C and any one of the two metal baffles 126 along the second direction S may be 0.5 times the wavelength of the center frequency of the base station antenna 100. When the distance E in the second direction S between the central axis C and any metal baffle

126 is greater than or less than 0.5 times the wavelength of the center frequency of the base station antenna 100, the convergence of the horizontal beam width of the base station antenna 100 becomes poor.

Figure 4:
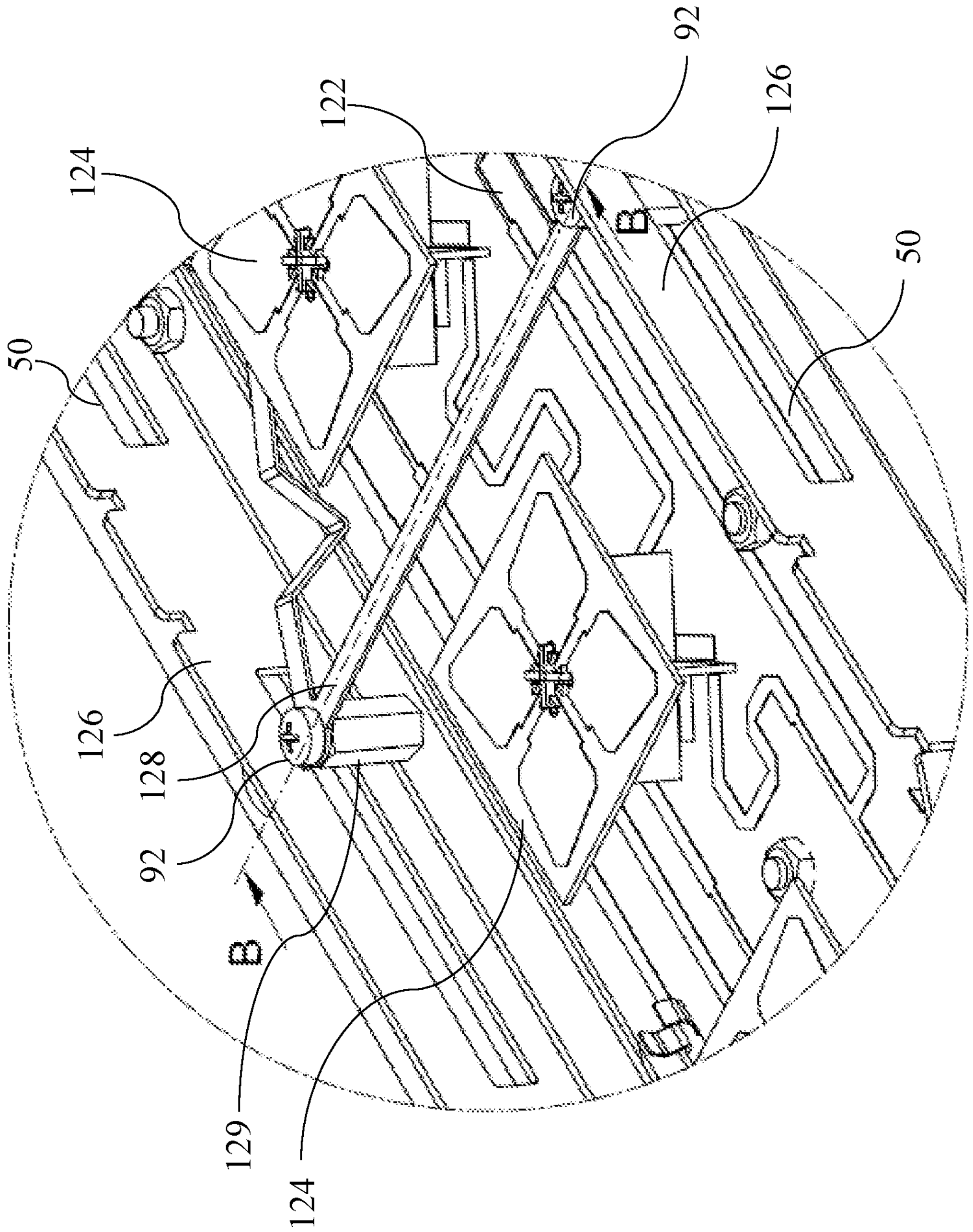
FIG. 4 is an enlarged schematic diagram of the area A of the base station antenna of FIG. 1.

In an embodiment, please refer to FIG. 1 and FIG. 4, wherein FIG. 4 is an enlarged schematic diagram of the area A of the base station antenna of FIG. 1. As shown in FIGS. 1 and 4, the base station antenna 100 may further comprise an isolation component 128, which is correspondingly disposed on the antenna sub-array 120, and the isolation component 128 is disposed between two adjacent radiation units 124 and between the two metal baffles 126 to achieve the effect of debugging and optimizing the isolation of the base station antenna 100. There is no special restrictions on the shape of the isolation component 128. It should be noted that the isolation component 128 does not contact the feeding plate 122 and the radiation units 124.

In an embodiment, referring to FIGS. 1 and 4, the base station antenna 100 may further comprise two isolation columns 129, which are disposed between two adjacent radiation units 124 and between the two metal baffles 126, and the isolation component 128 is connected with the two isolation columns 129. The height of the isolation column 129 may be less than, equal to or greater than the height of the radiation unit 124. When the height of the isolation column 129 is greater than the height of the radiation unit 124, the isolation effect of the base station antenna 100 can be improved.

Figure 5:
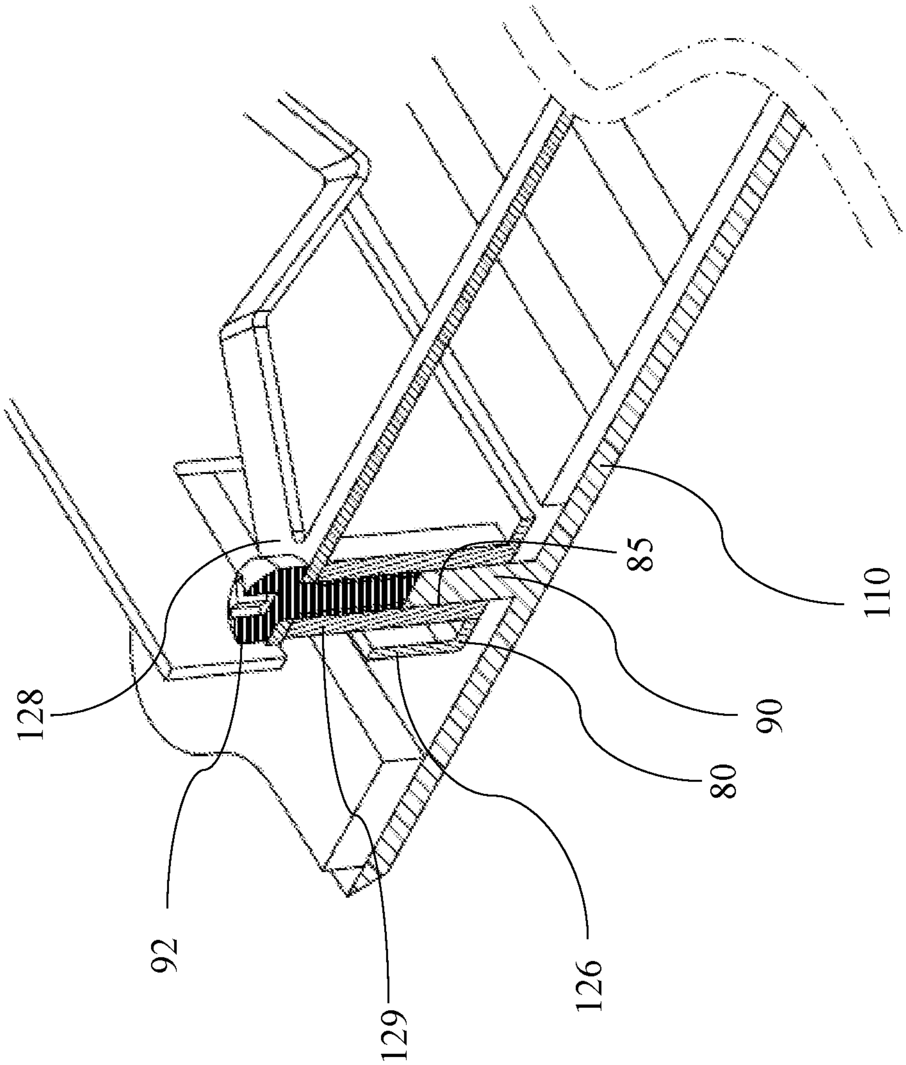
FIG. 5 is a cross-sectional view of the base station antenna of FIG. 4 along line BB.

In an embodiment, please refer to FIG. 4 and FIG. 5, wherein FIG. 5 is a cross-sectional view of the base station antenna of FIG. 4 along the line BB. As shown in FIGS. 4 and 5, each metal baffle 126 comprises a folded edge 80, each metal baffle 126 is connected to the substrate 110 through the corresponding folded edge 80, the bottom ends of the two isolation column 129 are connected to the folded edges 80 of the two metal baffles 126, the top ends of the two isolation columns 129 are connected to the isolation component 128, and the isolation component 128 does not contact the feeding plate 122 (that is, the two isolation columns 129 can raise the isolation component 128 so that the isolation component 128 does not contact the feeding plate 122). In more detail, the substrate 110 may further comprise two protruding columns 90 formed integrally extending upward. The two protruding columns 90 can pass through the folded edges 80 of the two metal baffles 126 and be inserted into the two isolation columns 129, and the two fixing members 92 can pass through the isolation component 128 and be inserted into the two isolation columns 129, so that the top end of each isolation column 129 is fixedly connected to isolation component 128. The number of the protruding columns 90 and the number of the fixing members 92 may correspond to the number of the isolation columns 129.

In an example, each isolation column 129 may be provided with a through hole 85 having an internal thread, each fixing member 92 may be, but not limited to, a screw having an external thread that matches the internal thread, and the surface of the protruding column 90 is provided with the external thread matching with the internal thread. That is, through the matching of the internal thread and the external thread, the isolation columns 129 and the metal baffles 126 can be fixed on the substrate 110, and the fixing members 92 and the isolation component 128 can be fixed on the isolation columns 129.

Figure 6:
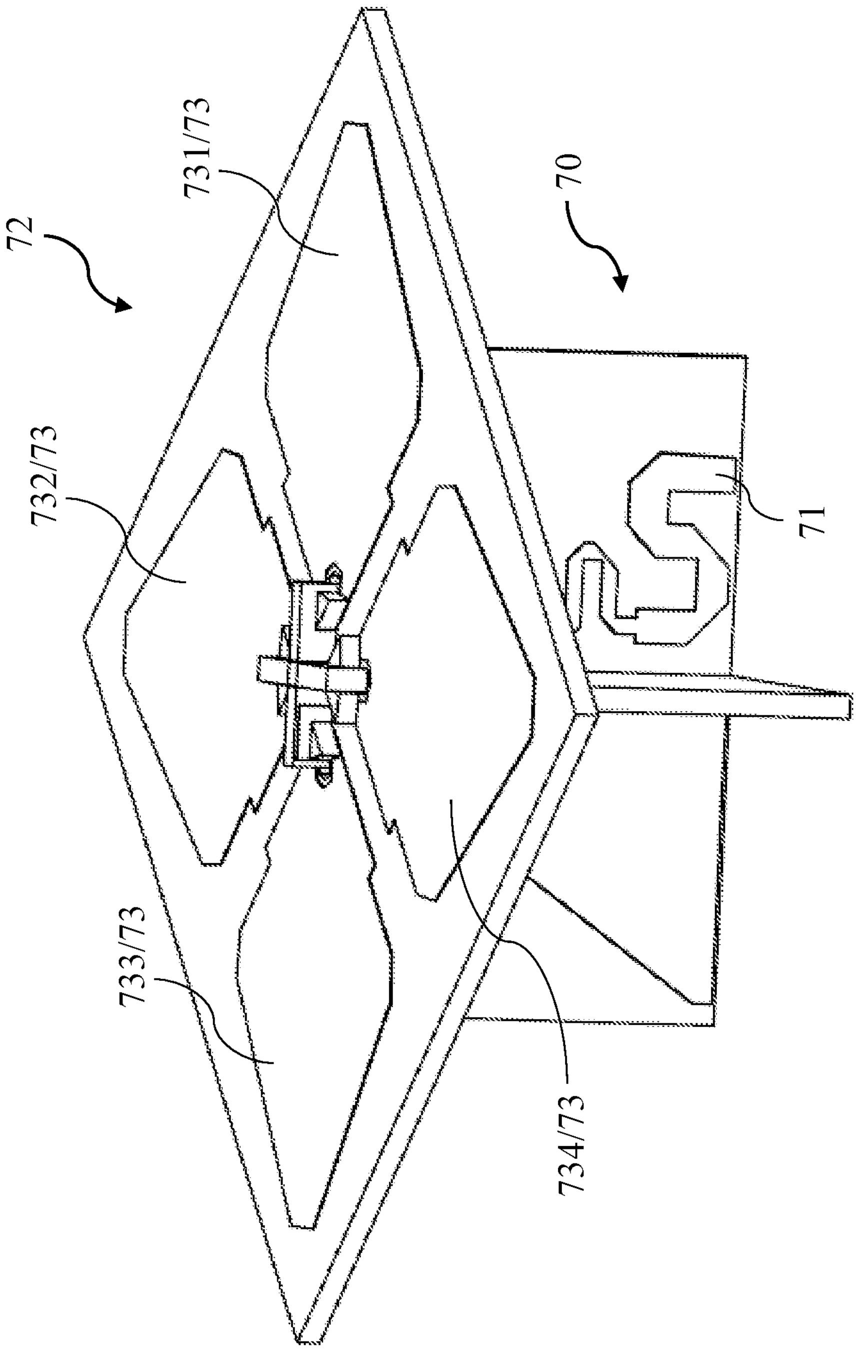
FIG. 6 is a three-dimensional schematic diagram of the radiation unit of FIG. 1.

In an embodiment, please refer to FIG. 1 and FIG. 6, wherein FIG. 6 is a three-dimensional schematic diagram of the radiation unit of FIG. 1. As shown in FIGS. 1 and 6, each radiation unit 124 comprises a balun support part 70 and an antenna oscillator part 72, wherein the antenna oscillator part 72 is disposed on and electrically connected to the balun support part 70, the balun support part 70 is disposed on the feeding plate 122, and the antenna oscillator part 72 and the balun support part 70 are both composed of printed circuit boards. Therefore, the antenna oscillator part 72 and the balun support part 70 of each radiation unit 124 are both made of printed circuit boards, so that each radiation unit 124 can be widely used in various antennas (e.g., MIMO antennas, notebook computer antennas, base station antennas), and the cost and product weight can be greatly reduced, while the intermodulation performance is effectively improved.

In an embodiment, referring to FIG. 6, the balun support part 70 may be provided with a curved balun wiring 71 to reduce the height of the radiation unit 124. Specifically, the balun wiring 71 with multiple bends is disposed on the balun support part 70, so that the routing arrangement of the balun wiring 71 is concentrated. In this way, the height of the balun support part 70 can be reduced to meet the low profile requirement of the radiation unit 124, so that the base station antenna 100 can be smaller and lighter in weight.

In an embodiment, referring to FIG. 6, the antenna oscillator part 72 may comprise at least a pair of oscillator arms 73, and a length of each oscillator arm 73 is 0.25 times the wavelength of the center frequency of the base station antenna 100. The shape of each oscillator arm 73 may be, but not limited to, a diamond shape, and the oscillator arms 73 included in the antenna oscillator part 72 may be arranged in a ring around a point.

In an example, the radiation unit 124 is a single-polarized antenna unit, the antenna oscillator part 72 may comprise a pair of oscillator arms 73 (that is, two oscillator arms 73), and the two oscillator arms 73 may constitute the horizontally polarized oscillator arms or the vertically polarized oscillator arms.

In another example, the radiation unit 124 is a dual-polarized antenna unit, and the antenna oscillator part 72 may comprise two pairs of oscillator arms 73, wherein one pair of oscillator arms 73 are a first oscillator arm 731 and a second oscillator arm 732, and the other pair of oscillator arms 73 are a third oscillator arm 733 and a fourth oscillator arm 734. The first oscillator arm 731 and the third oscillator arm 733 belong to the same polarized oscillator arm, and the second oscillator arm 732 and the fourth oscillator arm 734 belong to the same polarized oscillator arm. The first oscillator arm 731, the second oscillator arm 732, the third oscillator arm 733, and the fourth oscillator arm 734 are set around one point in sequence, the first oscillator arm 731 and the second oscillator arm 732 are disposed opposite to each other, and the third oscillator arm 733 and the fourth oscillator arm 734 are disposed opposite to each other. The first oscillator arm 731 and the third oscillator arm 733 are +45-degree polarized oscillator arms, and the second oscillator arm 732 and the fourth oscillator arm 734 are −45-degree polarized oscillator arms; or the first oscillator arm 731 and the third oscillator arm 733 are −45-degree polarized oscillator arms, the second oscillator arm 732 and the fourth oscillator arm 734 are +45-degree polarized oscillator arms; or the first oscillator arm 731 and the third oscillator arm 733 are horizontal polarized oscillator arms, and the second oscillator arm 732 and the fourth oscillator arm 734 are vertically polarized oscillator arms; or the first oscillator arm 731 and the third oscillator arm 733 are vertically polarized oscillator arms, and the second oscillator arm 732 and the fourth oscillator arm 734 are horizontally polarized oscillator arms.

In an embodiment, the distance between the antenna oscillator parts 72 of two adjacent radiation units 124 (that is, the distance between the points surrounded by the antenna oscillator parts 72 of the two adjacent radiation units 124) is 0.8 times the wavelength of the center frequency of the base station antenna 100. Therefore, the mutual coupling between the antenna oscillator parts 72 of the two adjacent radiation units 124 can be effectively reduced, and the isolation and upper sidelobe suppression can be improved.

In an embodiment, the number of the antenna sub-array 120 is plural, and the distance between two adjacent antenna sub-arrays 120 (that is, the distance between the central axis of the two adjacent antenna sub-arrays 120) is 1.5 times the wavelength of the center frequency of the base station antenna 100. Therefore, the mutual coupling between the antenna sub-arrays 120 can be effectively reduced. In an embodiment, the plurality of antenna sub-arrays 120 are arranged at intervals along the second direction S, and the distance between two adjacent antenna sub-arrays 120 in the second direction S is 1.5 times the wavelength of the center frequency of the base station antenna 100.

In an embodiment, referring to FIG. 1, when the base station antenna 100 comprises a plurality of antenna sub-arrays 120, the plurality of antenna sub-arrays 120 are arranged in parallel.

In an embodiment, referring to FIG. 1, the base station antenna 100 may further comprise a coaxial connector 130 and a coaxial cable 140, and the coaxial connector 130 is connected to the feeding board 122 through the coaxial cable 140. Therefore, the base station antenna 100 can feed power to the multiple radiating units 124 of the antenna sub-array 120 through the coaxial connector 130 and the coaxial cable 140, and the base station antenna 100 has a stable structure and has the certain advantage in intermodulation.

In an embodiment, referring to FIGS. 1 and 6, when the radiation unit 124 is a dual-polarized antenna unit, the coaxial connector 130 may comprise a first coaxial connector 130*a* and a second coaxial connector 130*b*, the first coaxial connector 130*a* is connected to the feeding plate 122, the first oscillator arm 731 and the second oscillator arm 732 through the first coaxial cable 140*a*, and the second coaxial connector 130*b* is connected to the feeding plate 122, the third oscillator arm 733 and the fourth oscillator arm 734 through the second coaxial cable 140*b*.

In an embodiment, each metal baffle 126 further comprises two inner folding pieces 62, the two inner folding pieces 62 are connected to opposite ends of each metal baffle 126 in the first direction R, and the two inner folding pieces 62 are respectively deflected from the opposite ends of each metal baffle 126 toward the corresponding radiation units 124, which is beneficial to further improve the convergence of the horizontal beam width of the base station antenna 100.

In a practical example, the base station antenna 100 may further comprise a radome not drawn, and the radome is configured to be assembled with the substrate 110 to protect the antenna sub-array 120. The material of the radome may comprise, but is not limited to, polycarbonate and acrylonitrile butadiene styrene (ABS). In one example, the radome and the substrate 110 can be assembled by buckling to facilitate subsequent maintenance of the base station antenna 100. In another example, the radome and the substrate 110 can be assembled by bonding to prevent moisture from entering the inner space of the base station antenna 100. The actual method of assembling the radome and the substrate 110 can be adjusted according to actual needs.

Figure 7:
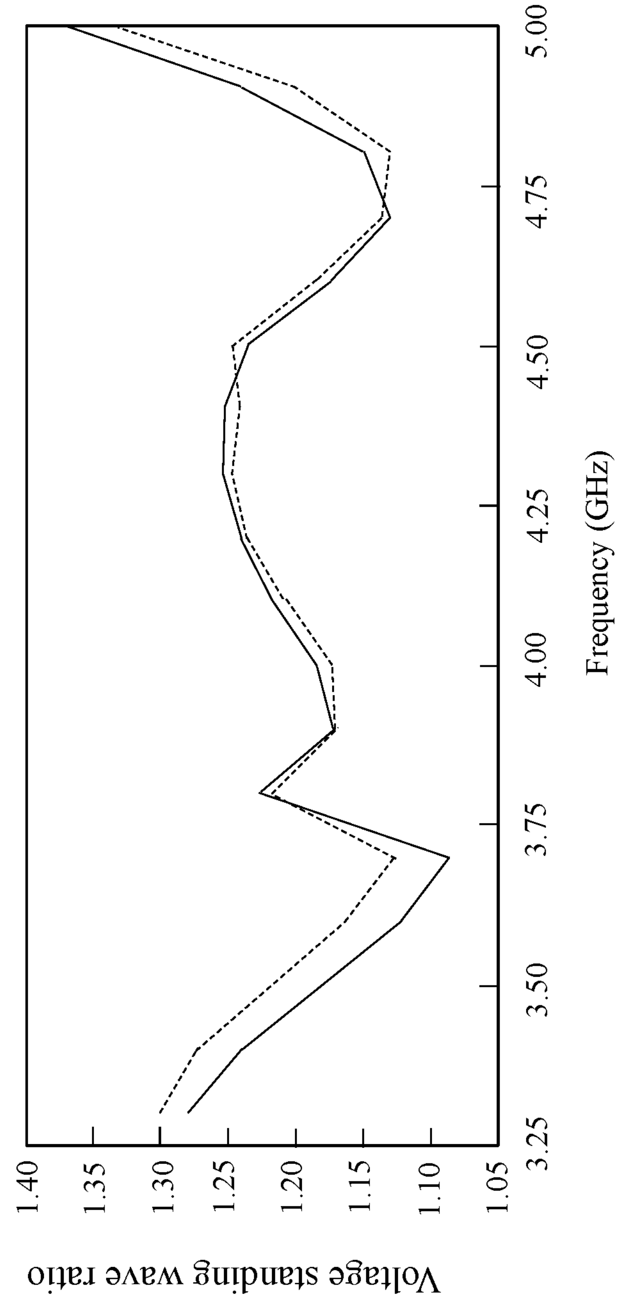
FIG. 7 is a simulation diagram of the voltage standing wave ratio of the base station antenna of FIG. 1.
Figure 8:
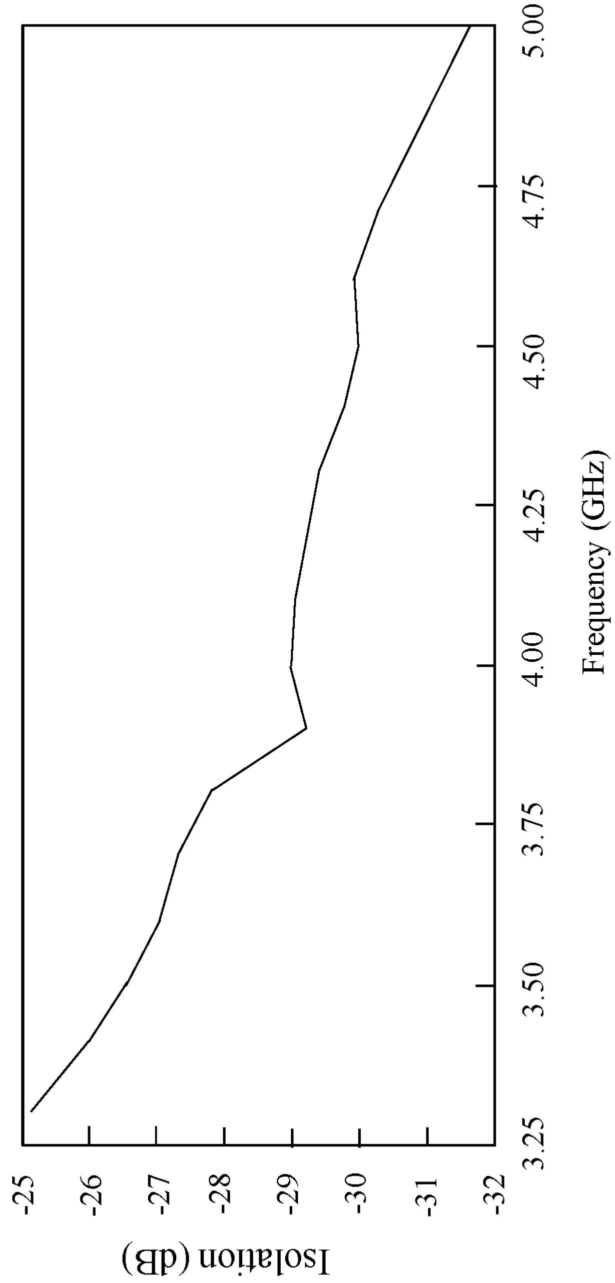
FIG. 8 is a simulation diagram of the isolation of the base station antenna of FIG. 1.
Figure 9:
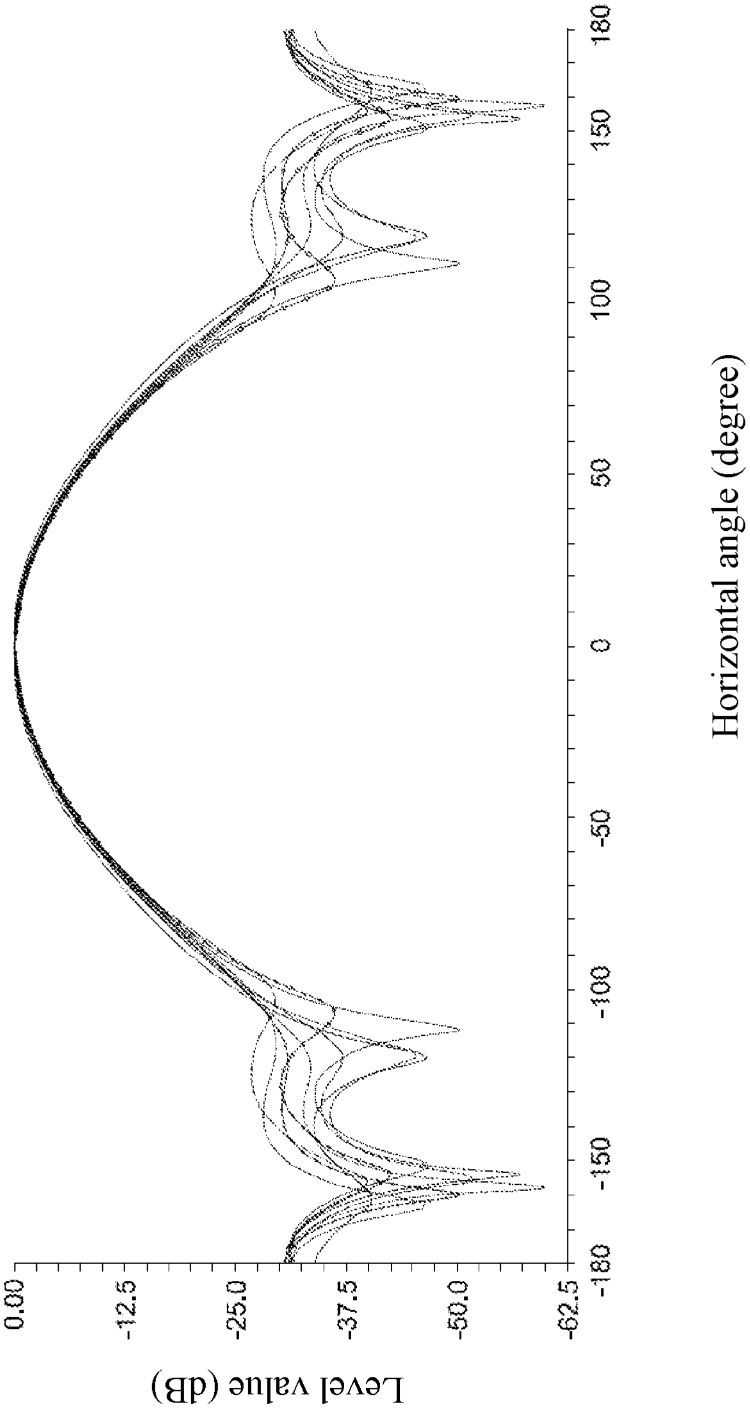
FIG. 9 is a simulation diagram of the horizontal beam width of the base station antenna of FIG. 1.
Figure 10:
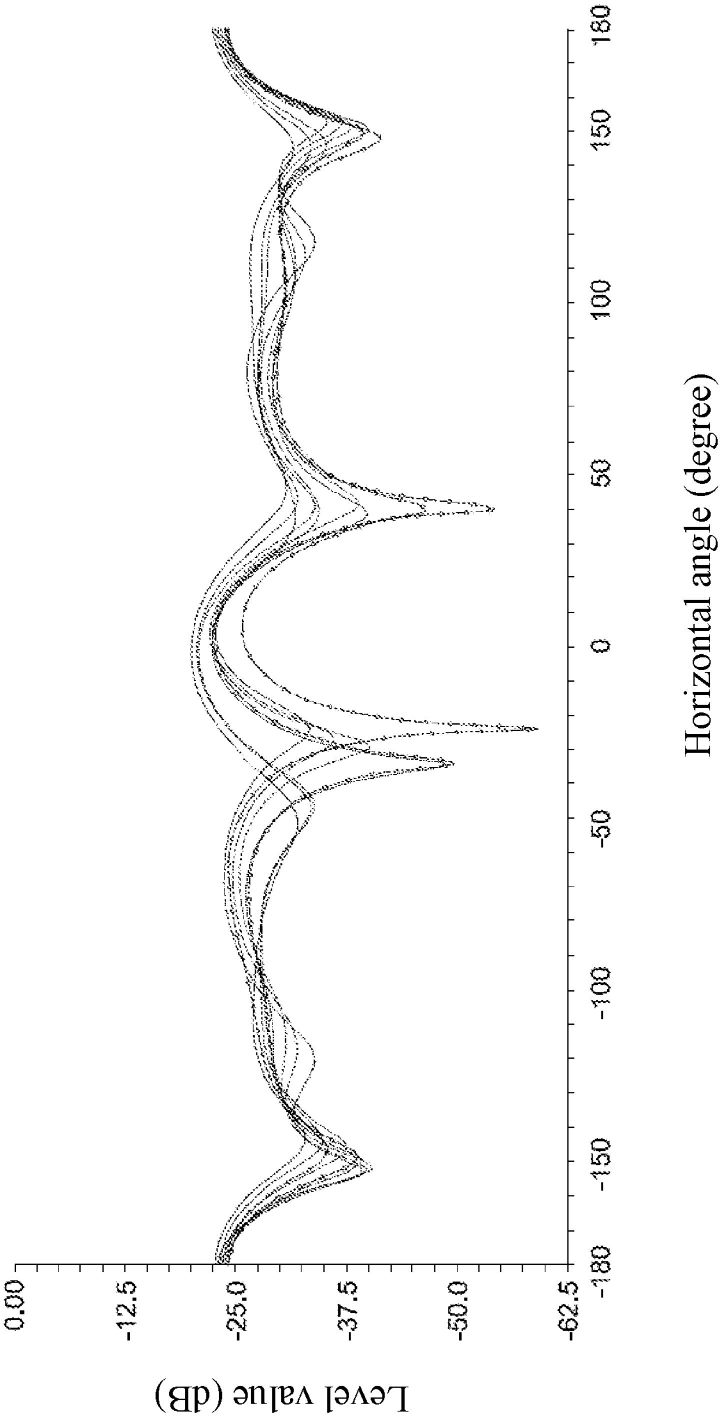
FIG. 10 is a simulation diagram of the polarization ratio of the base station antenna of FIG. 1.

Please refer to FIG. 1 and FIGS. 7 to 10. FIG. 7 is a simulation diagram of the voltage standing wave ratio of the base station antenna of FIG. 1, FIG. 8 is a simulation diagram of the isolation of the base station antenna of FIG. 1, FIG. 9 is a simulation diagram of the horizontal beam width of the base station antenna of FIG. 1, and FIG. 10 is a simulation diagram of the polarization ratio of the base station antenna of FIG. 1, wherein the operating frequency range of the base station antenna 100 is from 3.3 GHz to 5 GHz.

In FIG. 7, the horizontal axis represents the frequency in GHz, and the vertical axis represents the voltage standing wave ratio, the solid line and the dashed line are the voltage standing wave ratio curves of different input ports, respectively. It can be seen from FIG. 7 that in the frequency range of 3.3 GHz to 5 GHz, the voltage standing wave ratio of the base station antenna 100 is less than 1.4. Therefore, the base station antenna 100 has good voltage standing wave ratio performance and a good radiation characteristic.

In FIG. 8, the horizontal axis represents the frequency in GHz, and the vertical axis represents the isolation in dB. It can be seen from FIG. 8 that in the frequency range of 3.3 GHz to 5 GHz, the isolation of the base station antenna 100 is below −25.00 dB, so the base station antenna 100 has good isolation.

In FIG. 9 and FIG. 10, the horizontal axis represents the horizontal angle in degree, the vertical axis represents the level value in dB, the curves in FIG. 9 and FIG. 10 are the simulation curves of the horizontal beam widths and polarization ratios of the base station antenna 100 at the nine frequency of 3.3 GHz, 3.5125 GHz, 3.725 GHz, 3.9375 GHz, 4.15 GHz, 4.3625 GHz, 4.575 GHz, 4.7875 GHz and 5 GHz. It should be noted that since the results presented by the nine simulation curves in FIG. 9 and FIG. 10 are similar, they are not labeled and described. It can be seen from FIG. 9 and FIG. 10 that in the frequency range of 3.3 GHz to 5 GHz, the horizontal beam width can converge within the range from 62 degrees to 64 degrees, the axial cross polarization ratio is less than −18 dB, and the cross polarization ratio in the ±60-degree directions is less than −10 dB. Therefore, the base station antenna 100 can achieve the technical effects of converging the horizontal beam width, improving the cross polarization ratio, and improving the overall radiation performance.

In summary, in the embodiment of the present disclosure, by disposing two metal baffles each having the opening slot on two sides of the feeding plate provided with multiple radiation units along the first direction, respectively, and the length of each opening slot along the first direction corresponds to the wavelength of the center frequency of the base station antenna, the base station antenna can achieve the technical effects of converging the horizontal beam width and optimizing the cross polarization ratio. In addition, the radiation unit is composed of a printed circuit board, which can be widely used in various antennas to reduce costs and effectively improve intermodulation. Furthermore, through the design of the curved balun wiring, the profile height of the base station antenna is effectively reduced. Moreover, the isolation of the base station antenna is optimized through the arrangement of the isolation component and/or the isolation columns. Therefore, the base station antenna can meet the demand for 5G low-profile base station antennas in the current market.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A base station antenna, comprising:

a substrate; and an antenna sub-array, comprising:

a feeding plate disposed on the substrate;

a plurality of radiation units disposed on the feeding plate along a first direction and electrically connected to the feeding plate; and two metal baffles respectively disposed on two sides of the feeding plate along a second direction perpendicular to the first direction, wherein each of the two metal baffles extends along the first direction, and each of the two metal baffles is provided with an opening slot, and a length of the opening slot of each metal baffle along the first direction corresponds to a wavelength of a center frequency of the base station antenna;

wherein the length of the opening slot of each metal baffle along the first direction is 0.8 times the wavelength of the center frequency of the base station antenna.

2. The base station antenna according to claim 1, wherein each of the two metal baffles is provided with a plurality of the opening slots along the first direction, and a distance between two adjacent opening slots is 0.25 times the wavelength of the center frequency of the base station antenna.

3. The base station antenna according to claim 1, wherein the opening slot of each metal baffle is located at a center position of each metal baffle along the first direction.

4. The base station antenna according to claim 1, wherein each of the two metal baffles is provided with a plurality of the opening slots, and the plurality of the opening slots are located symmetrically with respect to a center position of each metal baffle along the first direction.

5. The base station antenna according to claim 1, wherein the feeding plate has a central axis extending along the first direction and located in a middle position between the two sides of the feeding plate along the second direction, the plurality of radiation units are arranged along the central axis, and a distance between the central axis and any one of the two metal baffles along the second direction is 0.5 times the wavelength of the center frequency of the base station antenna.

6. The base station antenna according to claim 1, further comprising an isolation component correspondingly disposed on the antenna sub-array and disposed between two adjacent radiation units and between the two metal baffles.

7. The base station antenna according to claim 6, further comprising two isolation columns disposed between the two adjacent radiation units and between the two metal baffles, wherein the isolation component is connected with the two isolation columns.

8. The base station antenna according to claim 7, wherein each metal baffle comprises a folded edge, each metal baffle is connected to the substrate through the corresponding folded edge, bottom ends of the two isolation columns are connected to the folded edges of the two metal baffles, top ends of the two isolation columns are connected to the isolation component, and the isolation component does not contact the feeding plate.

9. The base station antenna according to claim 1, wherein each radiation unit comprises a balun support part and an antenna oscillator part, the antenna oscillator part of each radiation unit is disposed on and electrically connected to the balun support part of each radiation unit, the balun support part of each radiation unit is disposed on the feeding plate, and the antenna oscillator part and the balun support part of each radiation unit are both composed of printed circuit boards.

10. The base station antenna according to claim 9, wherein the balun supporting part of each radiation unit is provided with a curved balun wiring to reduce a height of each radiation unit.

11. The base station antenna according to claim 9, wherein a distance between the antenna oscillator parts of two adjacent radiation units is 0.8 times the wavelengths of the center frequency of the base station antenna.

12. The base station antenna according to claim 9, wherein the antenna oscillator part of each radiation unit comprises at least a pair of oscillator arms, and a length of each oscillator arm is 0.25 times the wavelength of the center frequency of the base station antenna.

13. The base station antenna according to claim 1, wherein the number of the antenna sub-array is plural, and a distance between two adjacent antenna sub-arrays is 1.5 times the wavelength of the center frequency of the base station antenna.

14. The base station antenna according to claim 1, further comprising a coaxial connector and a coaxial cable, wherein the coaxial connector is connected to the feeding plate through the coaxial cable.

15. A base station antenna, comprising:

a substrate; and an antenna sub-array, comprising:

a feeding plate disposed on the substrate;

a plurality of radiation units disposed on the feeding plate along a first direction and electrically connected to the feeding plate; and two metal baffles respectively disposed on two sides of the feeding plate along a second direction perpendicular to the first direction, wherein each of the two metal baffles extends along the first direction, and each of the two metal baffles is provided with an opening slot, and a length of the opening slot of each metal baffle along the first direction corresponds to a wavelength of a center frequency of the base station antenna;

wherein each of the two metal baffles is provided with a plurality of the opening slots along the first direction, and a distance between two adjacent opening slots is 0.25 times the wavelength of the center frequency of the base station antenna.

16. The base station antenna according to claim 15, wherein the plurality of the opening slots are located symmetrically with respect to a center position of each metal baffle along the first direction.

17. The base station antenna according to claim 15, wherein the feeding plate has a central axis extending along the first direction and located in a middle position between the two sides of the feeding plate along the second direction, the plurality of radiation units are arranged along the central axis, and a distance between the central axis and any one of the two metal baffles along the second direction is 0.5 times the wavelength of the center frequency of the base station antenna.

18. A base station antenna, comprising:

a substrate;

an antenna sub-array, comprising:

a feeding plate disposed on the substrate;

a plurality of radiation units disposed on the feeding plate along a first direction and electrically connected to the feeding plate; and two metal baffles respectively disposed on two sides of the feeding plate along a second direction perpendicular to the first direction, wherein each of the two metal baffles extends along the first direction, and each of the two metal baffles is provided with an opening slot, and a length of the opening slot of each metal baffle along the first direction corresponds to a wavelength of a center frequency of the base station antenna; and an isolation component correspondingly disposed on the antenna sub-array and disposed between two adjacent radiation units and between the two metal baffles.

19. The base station antenna according to claim 18, wherein the number of the antenna sub-array is plural, and a distance between two adjacent antenna sub-arrays is 1.5 times the wavelength of the center frequency of the base station antenna.

* * * * *